_United States Patent_ [19]

Miller

[11] 3,976,573

[45] Aug. 24, 1976

[54] TRASH CATCHING DEVICE

[76] Inventor: John M. Miller, Rte. 1, Box 273, Rocky Ford, Colo. 81067

[22] Filed: Jan. 17, 1975

[21] Appl. No.: 541,715

[52] U.S. Cl. .............................. 210/158; 210/160; 210/526
[51] Int. Cl.² ......................................... B01D 33/14
[58] Field of Search .......... 210/154, 155, 156, 157, 210/158, 159, 160, 354, 400, 526

[56] References Cited
UNITED STATES PATENTS

| | | | |
|---|---|---|---|
| 658,196 | 9/1900 | Whitney | 210/160 X |
| 840,973 | 1/1907 | Todd | 210/156 |
| 1,076,483 | 10/1913 | Collar | 210/156 |
| 1,188,340 | 6/1916 | Tark | 210/158 |
| 1,585,461 | 5/1916 | Brackett | 210/160 |
| 3,802,565 | 4/1974 | Hughes et al. | 210/158 X |

_Primary Examiner_—Theodore A. Granger
_Attorney, Agent, or Firm_—Horace B. Van Valkenburgh; Frank C. Lowe

[57] ABSTRACT

An endless screen extends around an upper roller, above the stream of a ditch or the like, and a lower roller, submerged in the stream. A cleaning brush engages the underside of the lower reach of the screen, the brush rotating in a direction opposite to the movement of the screen, while a roller or rod supports the screen just below the brush. The brush may be driven directly from a motor and speed reducer, with a belt drive to an upper pulley producing further speed reduction, or a speed reduction drive between the motor and the brush with a belt or chain drive to the upper roller may be utilized.

The lower roller for the screen has a fixed center surmounted by a plastic or rubber bushing about which a cylinder of the lower roller rotates.

A weir directs water onto the screen, the weir including a transverse partition mounted in the ditch and having a rectangular slot therein. A rectangular funnel occupies the slot, having a base member extending to the screen and side members extending to side plates mounted on bars of a frame, with the forwardly extending members inside the plates.

3 Claims, 9 Drawing Figures

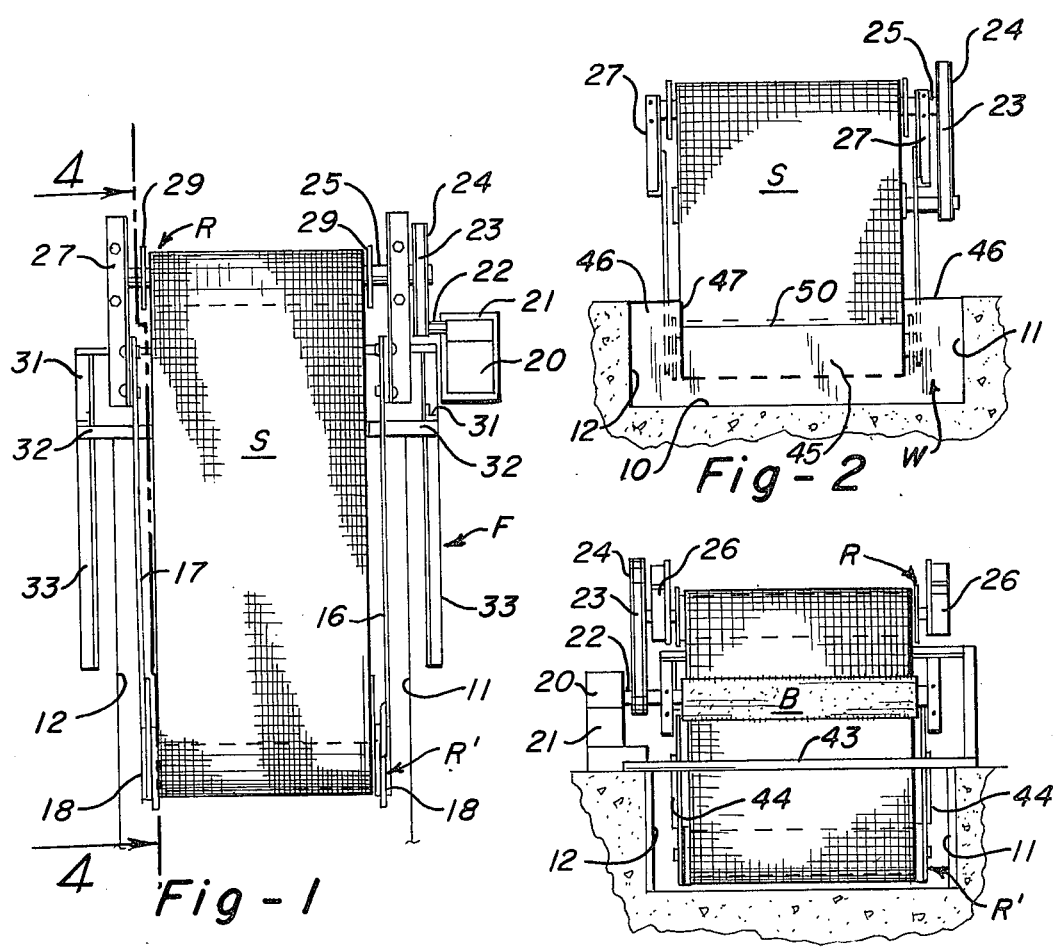
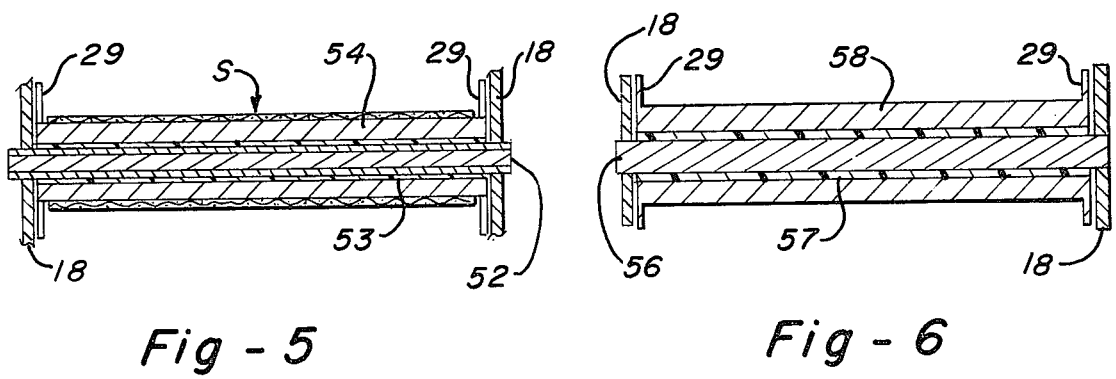

TRASH CATCHING DEVICE

This invention relates to a trash or debris catching device particularly adapted for use in an irrigation ditch.

During the passage of water down a stream or river, some leaves, tree branches or other trash may float to be carried down the river or stream to enter an irrigation ditch. Irrigation ditches are normally open and therefore may collect leaves, limbs, grass, weeds and the like during passage of the water. Such trash may be carried down to a point which would impede the flow through a diversion device, or even through a ditch lateral, to a field to be irrigated. The removal of such trash is thus of importance.

Of various previous trash removers, one utilizes parallel, substantially upright, stationary rods and movable rods pushed up through the stationary rods by chain drives, as in U.S. Pat. No. 2,823,802. Such a construction does not necessarily collect all the trash, some of which may slip between the upright rods and move on down the ditch. In another device, as exemplified by U.S. Pat. No. 1,585,461, a series of ropes extend around grooved upper and lower drums, the upper drum being rotated by a suitable drive mechanism. A shaft is provided with brushes to engage the ropes as they travel around the upper drum, with a smaller brush rotating oppositely to the upper brush. The upper brush moves in the same direction as the ropes and is therefore not as effective as desired in cleaning the ropes. Such a construction requires frequent replacement of the ropes, while a limb or the like of sufficient diameter will become fouled in the brush housing. The device is also unduly complicated by weights which tension the ropes.

In accordance with this invention, the trash to be collected is intercepted by a mesh screen, moving around upper and lower pulleys or rollers, either continuously or intermittently. The screen will collect and retain most smaller articles or material which might otherwise move through a series of generally upright rods, and the screen will also have a much longer life than ropes running over stretched pulleys. In addition, the entire mechanism is carried by a frame which is transportable from one ditch location to another, while a rotating brush for the screen is located in a much more advantageous position, engaging the underside of the screen at a point spaced a sufficient distance from the upper roller to give any trash, which might fall from the screen by gravity, an opportunity to do so. This brush is rotated against the movement of the screen, thereby insuring more effective cleaning of the screen. In addition, a special weir is installed to direct the water against the screen, so that the lower roller of the screen is submerged, preferably in an excavated portion of the ditch bottom. This weir is also provided with side plates which cooperate with side plates attached to the screen frame. The lower end of the screen frame is also adjustably suspended adjacent the bottom of the ditch in a manner which permits ready adjustment, useful for placement of the screen in different locations.

Other features of the apparatus of this invention will become apparent from the description which follows, taken in connection with the accompanying drawings, in which:

FIG. 1 is a top plan view of apparatus constructed in accordance with this invention;

FIG. 2 is an upstream or rear elevation of the apparatus of FIG. 1;

FIG. 3 is a downstream or front elevation of the apparatus of FIG. 1, with a trash collecting plate omitted for clarity of illustration;

FIG. 5 is a cross section, on an enlarged scale and taken along line 5—5 of FIG. 4 through a lower roller;

FIG. 6 is a cross section similar to FIG. 5, but showing an alternative lower roller construction;

Figure 4:
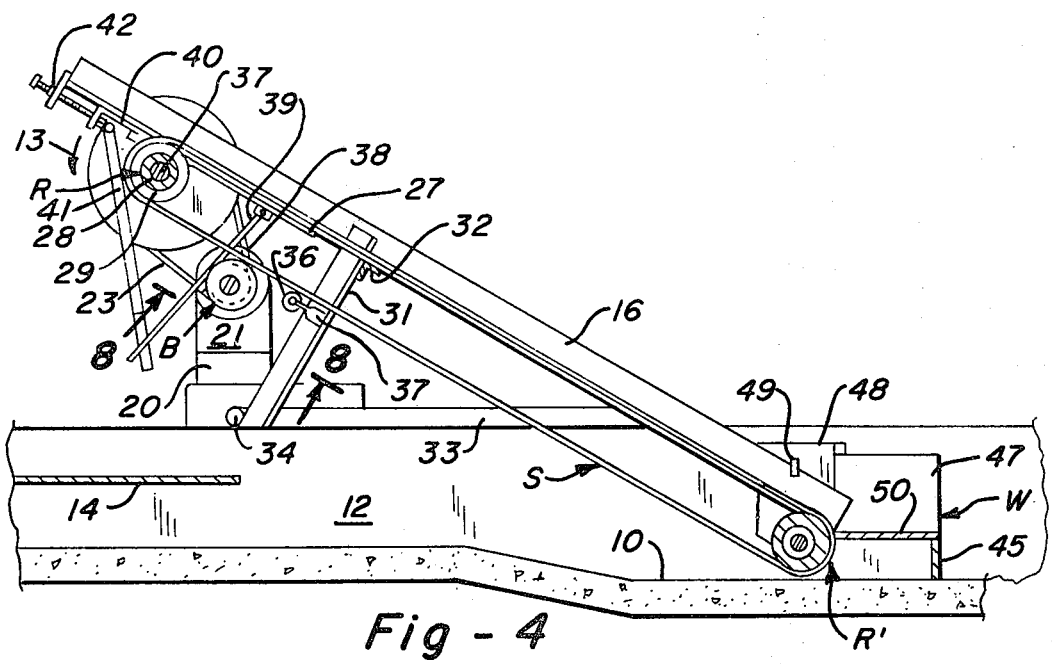
FIG. 4 is a vertical, longitudinal section, an an enlarged scale, taken along line 4—4 of FIG. 1.
Figure 7:
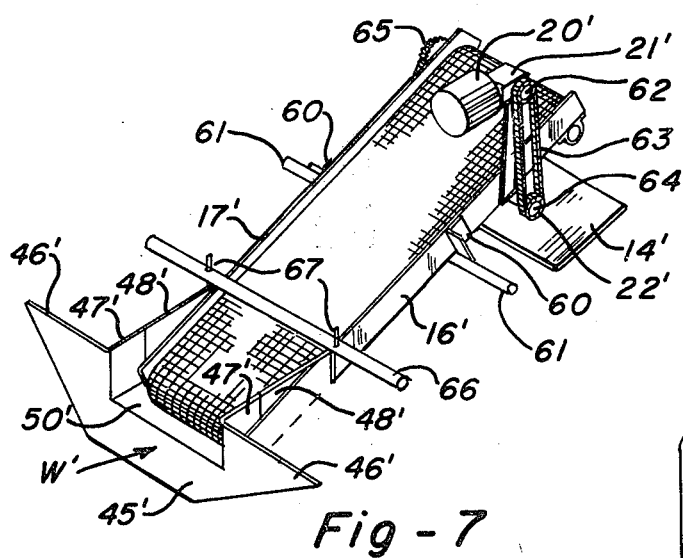
FIG. 7 is a fragmentary section taken along line 7—7 of FIG. 4, showing particularly a support roller for the screen.

As illustrated in FIGS. 1–4, apparatus constructed in accordance with this invention may comprise an endless screen S moving around and driven by an upper roller R which is mounted at the upper, front end of a slanted frame F. A lower roller R' for the screen is located in a deepened section 10 of a ditch, having side walls 11 and 12, as in FIG. 4. The upper roller is driven in a direction such that the top reach of the screen will move upwardly from the lower roller to the upper roller, then around the upper roller and downwardly along a lower reach. A brush B, rotated in an opposite direction to the movement of the screen S, is mounted beneath the screen, so as to engage the underside of the screen in its downward path. Material which falls off the screen moving around the upper roller R, as indicated by the arrow 13 of FIG. 4, as well as material removed by brush B, will fall onto a collection plate 14 which is mounted between the sides of the ditch at a position above the water level. The water level may vary, depending upon the amount of water being sent down the ditch, but the collection plate 14 is placed in a position above the highest water level expected. Water is directed onto the screen by a weir W, the details of which will be described later.

The screen is conveniently a spiral woven belt, such as the U.S.S. Cyclone belt No. E 24-22-12, i.e. having 24 mesh openings per foot of belt width and 22 cross connecting wires per foot of belt length, with the wire gage for both the spirals and the cross connectors being No. 12.

Frame F includes a pair of side bars 16 and 17 extending upwardly along opposite sides of the screen S and above the upper reach thereof, so as to force the water flowing down the ditch to flow through the screen, with guidance also from weir W. An offset 18 of the respective side bars permits the bars 16 and 17 to approach the edge of the screen while still providing support for lower roller R'. Power to drive the screen S is supplied by a motor 20 which may be supplied with electricity from a power line or from a battery. One charge of the battery has been found to permit the battery to supply sufficient electricity to move the screen at selected times over a period of 30 days. This has been accomplished when a timing device was associated with the screen drive motor, so that the motor will operate for 10 or 15 minutes during each hour, permitting the trash or debris to collect on the screen during the time that the motor is stopped. Motor 20 acts through a self-contained speed reducer 21 connected to a shaft 22 for brush B. A smaller pulley mounted on the brush shaft engages a V-belt 23 to rotate a larger pulley 24 mounted on a shaft 25 of the upper roller R. Through the difference in diameter of the pulleys, the screen roller is driven at a slower speed than brush B. Bearings 26 for the upper roller shaft are mounted on the underside of an adjustable frame angle 27 which extends longitudinally in relation to the screen. One flange of angle 27 extends upwardly and the other flange horizontally but outwardly from the screen, in order to accommodate the shaft bearings 26. The roller R for the upper end of screen S is essentially a drum 28 mounted on and rotating with the shaft 25, as in FIG. 4, and provided with a flange 29 at each end of the drum and at opposite sides of the screen, as in FIG. 1.

The screen and screen frame are supported in an angular position, such as 30° to 40° to the horizontal, as in FIG. 4, through a transverse side leg 31 of frame F, connected at its upper end to the side bar 16 or 17 and an angle 32 which extends beneath the upper pass of the screen, to reinforce the center of the frame. Side leg 31 extends downwardly to a member 33, such as an angle, which rests on the top of the side wall of the ditch, while a cross member, such as a tubular pipe 34, extends between the front ends of the side members 33. As indicated previously, the brush B is spaced a sufficient distance from the upper roller to permit any trash passing over the upper roller, while on the screen, to fall off by gravity if it is inclined to do so. This reduces the load on the brush B and permits it to act vigorously against trash or the like entwined or otherwise caught in the interstices of the screen. An appropriate distance for the brush from the upper roller, as shown in FIG. 4, is a distance such that the furthest downstream point of engagement of the brush with the screen is further upstream than the furthest upstream point of the upper roller R. A smaller roller or bar 36 supports the screen on the opposite side of the brush B from the upper roller R, to minimize movement of the screen toward or away from the brush. Roller 36 is mounted in bearings 37, in turn mounted on the respective leg 31. When a stationary bar is substituted for screen guide roller 36, suitable brackets may be substituted for bearings 37. The brush shaft 22 is mounted in bearings 38 which are adjustable along a pivoted bar 39 at each side and each of which is pivoted on the underside of a slide bar 40 beneath frame angle 27. Bearings 38 are held in position against the screen by any suitable adjustment device, such as a conventional adjusting device at or adjacent the lower end of a rod 41, pivoted on slide bar 40, to which the upper roller bearings are also attached. Each slide bar 40 is adjustable along angle 32 by a conventional adjusting device 42. The lower end of the frame is suspended from a transverse beam 43, which spans the ditch, by a pair of threaded rods 44, each of which is connected to one side of the frame bar 16 or 17 at a position spaced from the lower roller R'. As will be evident, with the frame rollers and screen a unitary construction, it is very easy to adjust the position of the frame, either longitudinally along the ditch or angularly.

The weir W shown comprises an upright bottom plate 45 which is installed in the bottom of the ditch and having a pair of extensions 46 extending upwardly and to each side to the side of the ditch, as in FIG. 2, leaving open a notch above the bottom plate. A pair of wings 47 may be attached to the inner edge of each side extension 46, so as to extend toward and overlap the inside of a pair of triangular side plates 48 which are welded to the top of the frame F, or removably attached thereto, as by bars 49 of FIG. 4. The weir structure is completed by a base plate 50 which extends forwardly from the bottom of the notch in bottom plate 45. Base plate 50, together with wings 47, form a funnel, as it were, to direct the full stream flow onto the screen S. The edge of base 50 extends as close to the screen S as possible without rubbing against the screen, thereby insuring that all screenable material will be moved by the stream against the screen.

Since the upper roller is not under water, the material of which it is made could be merely rust-resistant, since the screen itself, as well as the trash thereon, will be dripping water onto the upper roller. Of course, the upper bearings 26 are not so subject to water and therefore may be lubricated in the usual manner. However, the lower roller is completely submerged in the ditch at all times and therefore should be specially constructed. As shown in FIG. 5, a stationary pin 52 formed of a suitable material, such as brass on a steel center, may extend between the offsets 18 of side plates 16 and 17. Pin 52 is surrounded by a bushing 53 formed of a suitable plastic, such as polyvinyl chloride, surmounted by a drum 54 formed of a material suitable for rotation about the bushing 53, such as steel.

In the alternative lower roller illustrated in FIG. 6, the central pivot 56 is formed of stainless steel, while a bushing 57 is formed of a special size rubber hose, on which turns a cylinder 58, such as formed of water pipe and having end flanges 29 merely screwed thereon.

Figure 8:
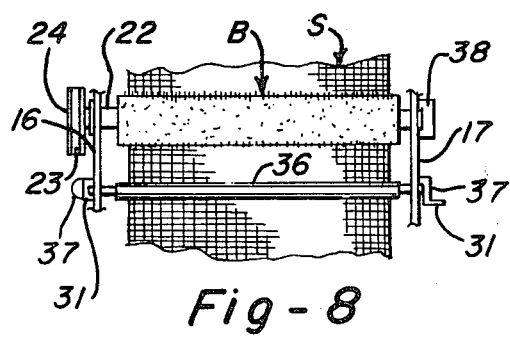
FIG. 8 is a perspective view of an alternative apparatus constructed in accordance with this invention.

In the alternative construction illustrated in FIG. 8, a similar screen S is utilized, which extends over a lower roller and an upper roller, as before. The side bars 16' and 17' extend between the pin for rotation of the lower roller and angles 27' by which the position of the bearings for the upper roller are adjusted. Angles 60 are attached to the side bars 16' and 17' to provide an angular bearing for engagement with a tubular bar 61 which extends across the ditch. A roller corresponding to the roller 36 is mounted for rotation by bearings attached to the angles 60, while rotating brush B is mounted on a shaft 22'. A trash collection plate 14' is adapted to extend across the ditch, while a motor 20' and speed reducer 21' are mounted at the top of the framework, rather than being placed upon the bank of the ditch. Speed reducer 21' drives a pulley 62 through which a V-belt 63 drives a pulley 64 for turning the brush shaft 22'. Each of the motor and speed reducer, upper screen roller and brush bearings are mounted on a slide bar corresponding to slide bar 40 of FIG. 4, so that any adjustment of the tension on the screen, as by adjusting the position of the upper roller, will not require any further adjustment of the motor and speed reducer, upper roller or brush bearings relative to one another. A V-belt 65 at the opposite end of the brush engages a larger pulley on the shaft of the upper roller and a smaller pulley on the brush shaft 22', so that, again, the brush is rotated at a faster rate than the screen pulleys. The lower end of the framework is again adjustably suspended in the ditch from a cross bar or tube 66 which spans the ditch and from which adjustable bolts 67 or the like extend through suitable holes in the tube 66.

Side plates 48' are again mounted on the lower edges of the side bars 16' and 17', while a weir W' cooperates with the side bars 48' to require all of the water passing down the ditch to flow through the screen S. Thus, the weir plate 45' is formed with a central notch, as before, but with a funnel comprising side plates 47' and bottom plate 50' inserted in the notch.

Figure 9:
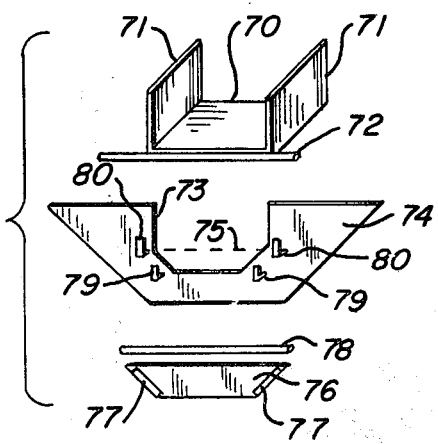
FIG. 9 is an exploded cabinet drawing of the parts of an alternative weir.

The weir of FIG. 9 is a further alternative arrangement in which a funnel comprises a base plate 70 and side plates 71 attached together and to a pivot pin 71 adapted to fit into notch 73 in ditch plate 74, fitting down to the dotted line 75. An inverted trapezoidal flush gate 76 provided with wings 77 fits into a lower extension of notch 73 below the dotted line, being held in position by a rod 78 which fits in inclined hooks 79 welded or otherwise suitably attached to the ditch plate 74, with the wings 77 also engaging plate 74. With the slot 73 thus filled up to the the dotted line 73, the funnel may be placed in position, with the base plate 70 and side plate 71 in the remainder of notch 73 and pin 72 in a second set of inclined hooks 80, above hooks 79. As will be evident, removal of the funnel and the flush gate 76 will permit substantially normal flow in the ditch when the trash catcher is moved to another position.

Although different embodiments of this invention have been illustrated and described, it will be understood that additional embodiments may exist and that changes may be made, all without departing from the spirit and scope of this invention.

What is claimed is:

1. A device for removing trash or debris and intended for use in a ditch having banks and water flowing therethrough to a predetermined level and below said banks, comprising:
    a pair of parallel rollers mounted on shafts spaced horizontally and vertically;
    a framework adapted to be supported by the banks of said ditch and to support one roller shaft upstream and below said predetermined level and the other roller shaft downstream and above the level of the ditch banks;
    an endless screen extending around and between said rollers and thus having an upper reach and a lower reach;
    means for rotating at least one of said rollers and thereby move said screen upwardly from the lower roller to the upper roller, along said upper reach, then around said upper roller and downwardly to said lower roller, along said lower reach, then around said lower roller;
    said framework having plates extending between said rollers and flanking each side of said upper reach of said screen, said plates extending above said upper reach;
    a partition constructed and arranged to be positioned upright and transversely of said ditch and to extend between said banks, with the upper edge of said partition above said predetermined level and said partition being adjacent but upstream of said lower roller, said partition having a notch whose lower edge is adapted to be positioned opposite said lower roller and below the upper edge thereof, with the side edges of said notch being opposite the side edges of said screen; and
    a water funnel having a base constructed and arranged to extend from the lower edge of said notch to said screen and a pair of upright side members adapted to extend from the sides of said notch to positions at either side of said screen.

2. A device as set forth in claim 1, wherein said partition is provided with:
    a lower notch extension having inwardly inclined edges below the position of said water funnel;
    a plate having an inverse trapezoidal shape corresponding to said notch extension; and
    separate means for holding said water funnel in said notch and said inverse trapezoidal plate in the lower extension of said notch.

3. A device for removing trash or debris and intended for use in a ditch having banks and water flowing therethrough to a predetermined level and below said banks, comprising:
    a pair of parallel rollers mounted on shafts spaced horizontally and vertically;
    a framework adapted to be supported by the banks of said ditch and to support one roller shaft upstream and below said predetermined level and the other roller shaft downstream and above the level of the ditch banks;
    an endless screen extending around and between said rollers and thus having an upper reach and a lower reach;
    means for rotating at least one of said rollers and thereby move said screen upwardly from the lower roller to the upper roller, along said upper reach, then around said upper roller and downwardly to said lower roller, along said lower reach, then around said lower roller;
    said framework having plates extending between said rollers flanking each side of said upper reach of said screen, said plates extending above said upper reach;
    means adapted to be positioned to receive trash falling by gravity from said screen as it passes around said upper roller;
    a brush mounted for rotational engagement with the lower reach of said screen at a position spaced from said upper roller, the furthest downstream point of engagement of said brush with said screen being further upstream than the furthest upstream point of said upper roller;
    bar means extending transversely beneath said lower reach of said screen adjacent said brush, for supporting said lower reach and maintaining a substantially constant position of said lower reach at said brush; and
    means for adjusting the position of said brush along and toward and away from said screen, said trash receiving means being adapted to be positioned to receive debris removed from said screen by said brush.

* * * * *